United States Patent [19]

Tachibana

[11] Patent Number: 4,723,914

[45] Date of Patent: Feb. 9, 1988

[54] MICROSCOPIC SPECIMEN

[76] Inventor: Yoshiro Tachibana, 2-20 NishiNippori 1 chome, Arakawa-ku, Tokyo, Japan, 116

[21] Appl. No.: 41,048

[22] Filed: Apr. 21, 1987

[51] Int. Cl.⁴ .............................................. G09B 23/00
[52] U.S. Cl. ..................................... 434/297; 434/276
[58] Field of Search ............... 434/297, 296, 295, 276, 434/299

[56] References Cited

U.S. PATENT DOCUMENTS

| | | | |
|---|---|---|---|
| 472,980 | 4/1892 | Brown | 434/297 |
| 696,750 | 4/1902 | Riker | 434/297 |
| 792,501 | 6/1905 | Davis | 434/297 |
| 1,104,371 | 7/1914 | McGlashan | 434/297 |
| 1,151,280 | 8/1915 | McGlashan | 434/297 |
| 3,130,099 | 4/1964 | Homburger | 434/296 X |
| 3,191,319 | 6/1965 | Waisgerber | 434/299 |
| 3,613,265 | 10/1971 | Stern et al. | 434/297 |
| 4,010,554 | 3/1977 | Compton | 434/297 |

Primary Examiner—William H. Grieb
Attorney, Agent, or Firm—Holman & Stern

[57] ABSTRACT

The present invention is a microscopic specimen in which objects are mounted on a substrate and held between polyester laminated films so as to be hermetically sealed therebetween and is comprised as described below. A plurality of through-holes is provided at the lower portion of the substrate and the objects are placed in these through-holes. A figure representing the organism of an animal or plant from which the objects have been collected is displayed above the through holes on the substrate. A first series of name displays indicating the names of the objects is provided in the vicinity of the figure of the organism on the substrate. A second series of name displays indicating the names of the objects is also provided on the substrate beneath the through-holes.

5 Claims, 3 Drawing Figures

ND RELATED ART STATEMENT

MICROSCOPIC SPECIMEN

BACKGROUND OF THE INVENTION AND RELATED ART STATEMENT

The present invention relates to a microscopic specimen in which a object collected from the organism of an animal or plant is enclosed, particularly to a microscopic specimen which is suitable for use in studies undertaken by children.

Conventional microscopic specimens in which objects collected from the organisms of animals or plants are mounted are comprised as described below. Objects collected from the organisms of animals or plants are mounted on a glass plate at suitable intervals. A cover glass is fixed to the glass plate by applying a liquid adhesive to the periphery of the lower surface so as to cover the objects. Pieces of paper on which the names of the objects are indicated are pasted on the glass plate.

In the above-described conventional types of microscopic specimen, when the respective objects are recognized, they are confirmed by the names indicated on the pieces of paper pasted on the glass plate. However, there has been a problem that school children cannot easily recognize from the objects the entire image of the animals or plants from which the objects have been collected and which form parts of the animals or plants concerned. In addition, there has been a problem in that when school children unskilled in handling a microscope bring the object lens toward a specimen so as to focus the lens, the object lens is sometimes mistakenly brought down so far as to collide with the specimen and thus break the glass plate over the specimen.

The present invention has been achieved in consideration of these problems and it is an object thereof to provide a microscopic specimen which allows the entire image of an animal or plant from which an object has been collected and which forms part of the animal or plant to be recognized immediately at a glance, and which enables a beginner to safely study the specimen by observation without damaging it even if he mistakenly brings an object lens down so far as to strike the specimen.

SUMMARY OF THE INVENTION

The present invention is a microscopic specimen comprising objects which are mounted on a substrate and held between laminated polyester films so as to be hermetically sealed therebetween and has the following configuration. A plurality of through-holes are provided at the lower portion of the substrate and objects are placed in these through-holes. These through holes are positioned in parallel with one side of the substrate. The figure of the organism of an animal or plant from which the objects have been collected is displayed above the through holes on the substrate. When desired, index lines are drawn in the vicinity of the figure of the organism on the substrate to connect the object with the relevant one of a first series of name displays indicating the names of the objects. A second series of name displays is provided under the through holes on the substrate to indicate the names of the objects.

DETAILED DESCRIPTION OF PREFERRED EMBODIMENTS

Figure 1:
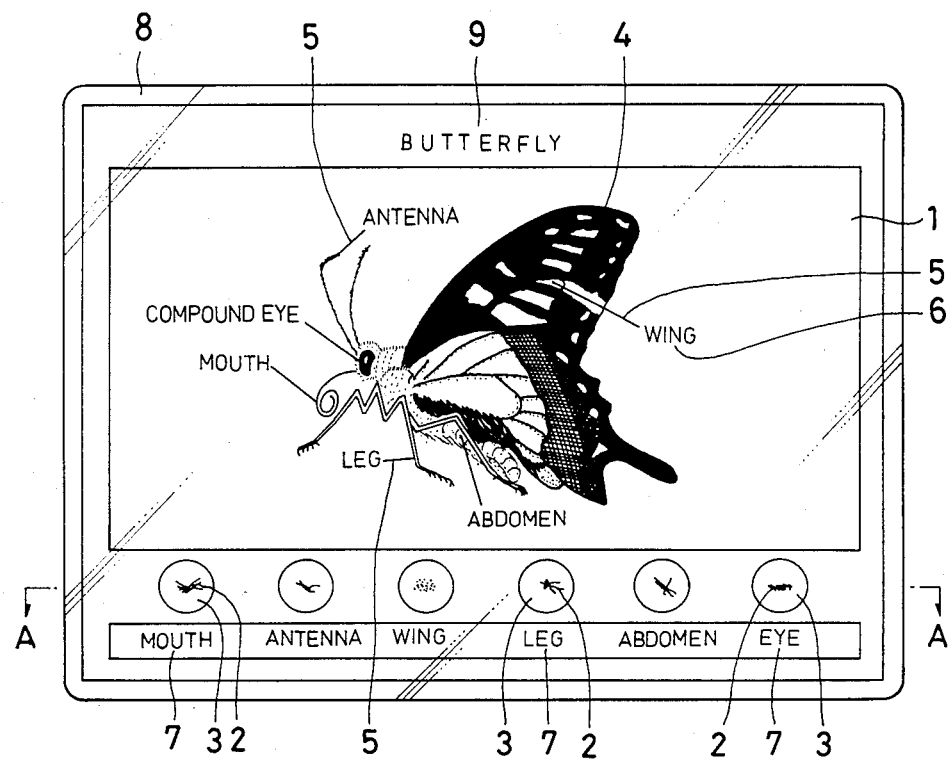
FIG. 1 is a plan view showing an embodiment of the present invention.
Figure 2:
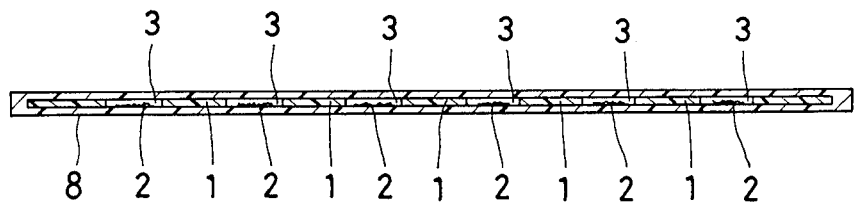
FIG. 2 is a sectional view taken along the line A—A in FIG. 1.

An embodiment of the present invention is described below with reference to the drawings.

A plurality of through-holes 3 is provided at a lower portion of a substrate 1 comprising a sheet of paper for placing objects 2 therein. The plurality of through-holes 3 are arranged in parallel with one side of the substrate 1. The FIG. 4 representing the entire organism of an animal or plant from which the objects have been collected is displayed above the through-holes 3 on the substrate 1. Index lines 5 which indicate the parts of the objects 2 are drawn to connect the FIG. 4 of the organism and the relevant name of a first series of name displays 6 indicating the names of the objects 2. A second name displays 7 indicating the names of the objects 2 is also provided beneath the through-holes 3 on the substrate 1. An organism name display 9 is provided at the top of the substrate 1.

The substrate 1 having the above configuration is held between laminated polyester films 8 to which an adhesive has been previously applied and the objects 2 are respectively mounted on the portions of the lower laminated polyester film 8 corresponding to the through-holes 3. When the laminated polyester films are press-bonded by a roller under heating, the adhesive applied to the laminated polyester films 8 melts and the substrate 1 and the objects 2 are held between the laminated polyester films 8 such as to be hermetically sealed therebetween.

The function of this embodiment is described below. When school children set a specimen having the above-described configuration on a microscope, they are able to catch the entire image of an animal or plant of which the object 2 form part, as they may study the objects 2 by observation at the same time as seeing overall the FIG. 4 of the organism. It is also possible to confirm immediately at a glance which parts of the organism the objects 2 represent by reading the first and second name displays.

In addition, since a plurality of the through-holes 3 in which the objects 2 are mounted is provided in parallel with one side of the substrate 1, when the objects are observed through a microscope, different objects can be observed by simply moving the specimen in the horizontal direction. Since the actual movement of the specimen in the longitudinal and transverse directions is reverse to what is seen through the lenses due to the character of the lenses of a microscope, the above-described configuration enables school children to easily position an object to be observed under the object lens.

Since the substrate 1 is made of a sheet of paper, the FIG. 4 of the relevant organism can be easily printed and illustrated in the actual colors so as to enable school children to recognize the true image of the objects relative to the whole. In addition, since the objects 2 are hermetically sealed between the polyester laminated films 8, if school children should mistakenly happen to bring the object lens of a microscope down so far as to strike against the specimen, no damage would occur as with conventional glass-made specimens. There is therefor no danger of school children being injured by the pieces of glass produced by broken glass-made specimens. Furthermore, handling and storage procedures are simplified and in particular an exclusive type of housing or rack is made unnecessary, unlike conventional glass-made specimens. In other words, the specimen of the present invention is not damaged when a stack of them is knocked over and thus offers improvements in terms of safety and durability.

Figure 3:
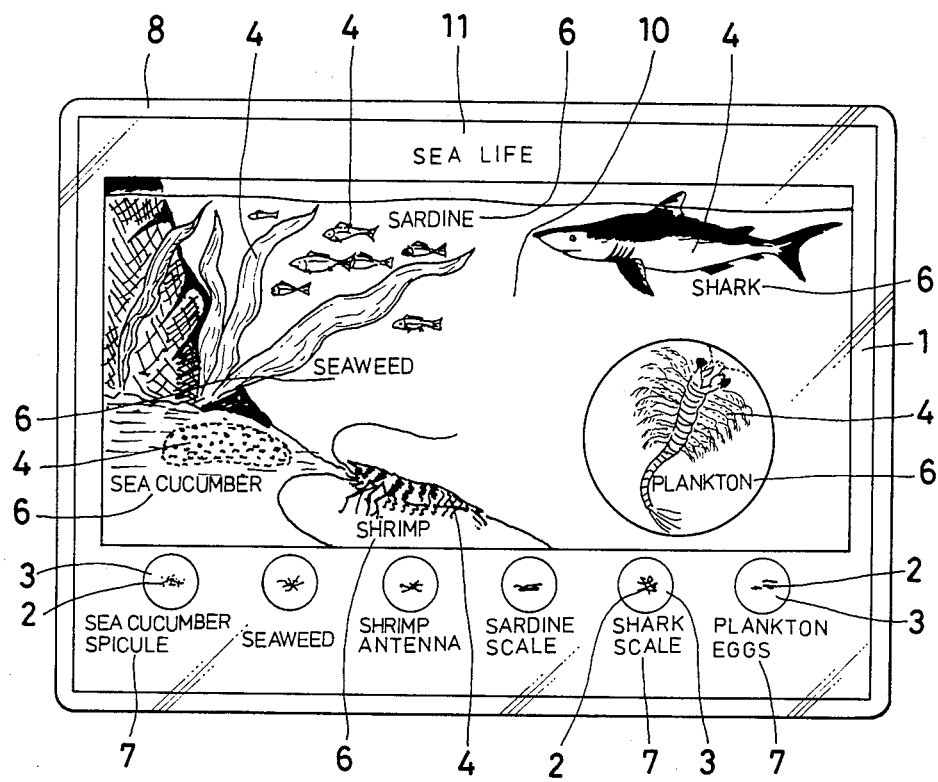
FIG. 3 is a plan view showing another embodiment of the present invention.

FIG. 3 shows another embodiment of the present invention in which those portions having the same configuration as that of FIG. 1 are denoted by the same reference numbers and description is omitted.

The embodiment shown in FIG. 3 comprises a plurality of FIGS. 4 of organisms displayed on a substrate 1 and a scene depicting the environment in which the organisms live is displayed in the background. A title name display 11 describing the scene depicted is provided at the top of the substrate 1. School children can thus study the particular type of the environment wherein the animals and plants depicted on the substrate 1 live by using this microscopic specimen.

In the embodiments shown in FIGS. 1 and 3, a sheet of paper is used as the material of the substrate 1, but the substrate may alternatively be made of plastic.

The present invention having the above configuration makes it possible to catch the entire image of an animal or plant by depicting the figure of the organism while allowing the objects to be studied by observation and enable the particular parts of the organism represented by the objects to be recognized by identifying the figure of the organism from which the objects have been collected and the names thereof. It Is therefore eminently suitable for use in studies undertaken by school children. In addition, since polyester laminated films are employed, the invention cannot be broken and can be handled with safety.

What is claimed is:

1. A microscopic specimen in which objects are mounted on a substrate and held between polyester laminated films so as to be hermetically sealed therebetween, comprising;
    a plurality of through-holes which are provided at the lower portion of said substrate and in which said objects are placed;
    a figure of the organism of an animal or plant, from which said objects are collected, displayed above said through-holes on said substrate;
    a first series of name displays indicating the names of said objects in the vicinity of said figure of the organism; and
    a second series of name displays displayed on said substrate beneath said through-holes and indicating the names of said objects.

2. A microscopic specimen according to claim 1, wherein said plurality of through-holes is provided in parallel with one side of said substrate.

3. A microscopic specimen according to claim 1, wherein said substrate is made from a sheet of paper.

4. A microscopic specimen according to claim 1, wherein a figure of the organism of a single animal or plant is displayed and said first series of name displays indicate the respective parts of said single animal or plant by means of index lines drawn from said figure of the organism.

5. A microscopic specimen according to claim 1, wherein a scene illustrating the environment wherein the animals or plants from which said objects have been collected live is depicted on said substrate.

* * * * *